(12) United States Patent
Kang et al.

(10) Patent No.: US 8,401,787 B2
(45) Date of Patent: Mar. 19, 2013

(54) METHOD OF DETERMINING DRIVE LANE USING STEERING WHEEL MODEL

(75) Inventors: Wooyong Kang, Daejeon (KR); Eunsung Lee, Daejeon (KR); Moonbeom Heo, Daejeon (KR); Giwook Nam, Daejeon (KR); Eunsup Sim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 13/354,276

(22) Filed: Jan. 19, 2012

(65) Prior Publication Data

US 2012/0283941 A1  Nov. 8, 2012

(30) Foreign Application Priority Data

May 4, 2011  (KR) .................. 10-2011-0042465

(51) Int. Cl.
   *G01C 21/12*  (2006.01)
(52) U.S. Cl. ...................... 701/472; 701/469
(58) Field of Classification Search ............... 701/33.1, 701/469, 472
   See application file for complete search history.

(56) References Cited

U.S. PATENT DOCUMENTS

| | | | | |
|---|---|---|---|---|
| 5,179,519 A * | 1/1993 | Adachi et al. | ................. | 701/457 |
| 5,339,246 A * | 8/1994 | Kao | ............... | 701/469 |
| 5,469,158 A * | 11/1995 | Morita | ........................ | 340/988 |
| 5,796,613 A * | 8/1998 | Kato et al. | ..................... | 701/472 |
| 5,828,987 A * | 10/1998 | Tano et al. | ..................... | 702/150 |
| 5,890,092 A * | 3/1999 | Kato et al. | ..................... | 701/469 |
| 6,351,706 B1 * | 2/2002 | Morimoto et al. | ............ | 701/431 |
| 6,446,000 B2 * | 9/2002 | Shimabara | ..................... | 701/428 |
| 6,681,180 B2 * | 1/2004 | Bevly et al. | ..................... | 701/36 |
| 7,113,866 B2 * | 9/2006 | Taliwal | ........................ | 701/410 |
| 7,230,567 B2 * | 6/2007 | Arakane et al. | ........... | 342/357.32 |
| 7,400,969 B2 * | 7/2008 | Watanabe et al. | ............. | 701/469 |
| 7,414,575 B2 * | 8/2008 | Watanabe et al. | ........ | 342/357.37 |
| 7,477,973 B2 * | 1/2009 | Brewer et al. | ................... | 701/41 |
| 7,561,961 B2 * | 7/2009 | Wakamatsu et al. | ........... | 701/469 |
| 7,606,661 B2 * | 10/2009 | Kwak | ........................ | 701/420 |
| 7,626,533 B2 * | 12/2009 | Cong et al. | ..................... | 342/70 |
| 7,742,872 B2 * | 6/2010 | Kimura et al. | ................ | 701/437 |
| 7,774,103 B2 * | 8/2010 | Deng et al. | ........................ | 701/1 |
| 8,041,472 B2 * | 10/2011 | Kobori et al. | ..................... | 701/8 |
| 8,111,147 B2 * | 2/2012 | Litkouhi | ...................... | 340/439 |
| 8,160,816 B2 * | 4/2012 | Kanai et al. | ..................... | 701/504 |
| 8,195,357 B2 * | 6/2012 | Basnayake | ................... | 701/33.1 |
| 2003/0023369 A1 * | 1/2003 | Takashima | .................. | 701/208 |
| 2003/0173127 A1 * | 9/2003 | Noecker | ...................... | 180/167 |

(Continued)

FOREIGN PATENT DOCUMENTS

| KR | 19970071406 A | 7/1997 |
|---|---|---|
| KR | 1020050012997 A | 2/2005 |

(Continued)

*Primary Examiner* — Thomas Black
*Assistant Examiner* — Sze-Hon Kong (57) ABSTRACT

Provided is a method of determining a drive lane using a steering wheel model. The method includes a step S100 of preparing a precise digital map having an accuracy capable of differentiating a road lane; a step S200 of estimating a vehicle location on a road using GPS information; a step S300 of checking whether the vehicle location information is normal using a difference between variation in the azimuth angle of the vehicle obtained by using the GPS information and variation in the azimuth angle of the vehicle obtained by using the steering wheel model; and a step S500 of determining and outputting a drive lane occupied by a running vehicle.

5 Claims, 6 Drawing Sheets

U.S. PATENT DOCUMENTS

| | | | |
|---|---|---|---|
| 2005/0004753 A1* | 1/2005 | Weiland et al. | 701/208 |
| 2005/0283312 A1* | 12/2005 | Taliwal | 701/214 |
| 2007/0055431 A1* | 3/2007 | Deng et al. | 701/71 |
| 2007/0078594 A1* | 4/2007 | Mori | 701/207 |
| 2009/0099730 A1* | 4/2009 | McClure et al. | 701/41 |
| 2009/0099772 A1* | 4/2009 | Chiu et al. | 701/213 |
| 2009/0138193 A1* | 5/2009 | Katou | 701/201 |
| 2010/0017128 A1* | 1/2010 | Zeng | 701/301 |
| 2010/0019963 A1* | 1/2010 | Gao et al. | 342/357.04 |
| 2010/0042282 A1* | 2/2010 | Taguchi et al. | 701/25 |
| 2010/0082250 A1* | 4/2010 | Kondoh | 701/214 |
| 2010/0114431 A1* | 5/2010 | Switkes et al. | 701/41 |
| 2010/0121518 A1* | 5/2010 | Tiernan et al. | 701/26 |
| 2010/0125414 A1* | 5/2010 | Okuyama et al. | 701/217 |
| 2010/0241355 A1* | 9/2010 | Park | 701/209 |
| 2010/0286872 A1* | 11/2010 | Endo et al. | 701/41 |
| 2010/0292886 A1* | 11/2010 | Szczerba et al. | 701/29 |
| 2010/0299063 A1* | 11/2010 | Nakamura et al. | 701/208 |
| 2010/0312527 A1* | 12/2010 | Weiland et al. | 703/1 |
| 2010/0332127 A1* | 12/2010 | Imai et al. | 701/208 |
| 2011/0109475 A1* | 5/2011 | Basnayake et al. | 340/902 |
| 2012/0029799 A1* | 2/2012 | Miller | 701/117 |
| 2012/0053755 A1* | 3/2012 | Takagi | 701/1 |

FOREIGN PATENT DOCUMENTS

| | | |
|---|---|---|
| KR | 1020060132302 A | 12/2006 |
| KR | 101010678 B1 | 1/2011 |

* cited by examiner

METHOD OF DETERMINING DRIVE LANE USING STEERING WHEEL MODEL

CROSS-REFERENCE(S) TO RELATED APPLICATIONS

The present invention claims priority of Korean Patent Application No. 10-2011-0042465, filed on May 4, 2011, which is incorporated herein by reference.

BACKGROUND OF THE INVENTION

1. Field of the Invention

The present invention relates to a method of determining a drive lane, and more particularly, to a method of accurately determining the drive lane of a road using a precise digital map capable of differentiating the lanes of the road and carrier-based differential GPS having a high accuracy capable of differentiating the lanes of the road as well as a steering wheel model of a vehicle.

2. Description of Related Art

Generally, a navigation device which is widely used in a vehicle in order to assist a driver is to provide route information to the driver's destination. A driver can see a map displayed on a terminal of a navigation system or listen to voice message while driving a car.

The navigation device functions to combine location information obtained from GNSS (global navigation satellite system) and geographic data of a digital map and then to display a vehicle position on a road displayed on the map.

However, a conventional navigation device can just indicate rough road information, but cannot indicate precise information about a drive lane occupied by a vehicle. In other words, the conventional navigation device can guide only route and direction information to a destination, but cannot guide the route on the basis of the drive lane of the road on which a vehicle is running. For example, in case that the vehicle which intends to turn left runs on other lanes except the first lane, the conventional navigation device could not inform of lane change.

Therefore, there is a problem in that, since a driver has to recognize and determine the conditions around the vehicle and the actual drive lane occupied by the vehicle and then to change the lane, it is limited to provide practical information to the driver.

In order to solve the problem, the inventors have proposed a method of determining the drive lane using precise GPS information capable of differentiating each road lane and a precise digital map capable of displaying the lane information, which has been filed and issued as a patent (Korean Patent No. 10-1010678 entitled "a navigation device and a drive lane determining method thereof").

In the drive lane determination method, a vehicle position is estimated on the basis of satellite signals received from a carrier-based navigation satellite system and compensation information received from a station, and an extent of lane differentiation is halved by determining a drive direction of the vehicle using vehicle location information and road lane information stored in a digital map, and a distance between a center line of each lane and a vehicle location is calculated by using the vehicle location information and the road lane information, and the road lane having a minimum value among the calculated distances is determined as a drive lane. In this method, however, the drive lane of a running vehicle is differentiated only using the satellite signals and the road lane information. Therefore, even when an error is occurred in the lane differentiation, it is impossible to correct the error, and thus reliability in the lane differentiation is deteriorated.

SUMMARY OF THE INVENTION

An embodiment of the present invention is directed to providing a method of determining a drive lane, in which a precise position differentiation technique and a precise digital map capable of differentiating each road lane are utilized, and in which it is checked whether an error is occurred in GPS information using information of a steering wheel direction of a vehicle, when the drive line is determined, and then if the error is occurred, the error can be corrected, thereby considerably increasing the performance of differentiating the road lane.

To achieve the object of the present invention, the present invention provides a method of determining a drive lane using a steering wheel model, including a step S100 of preparing a precise digital map having an accuracy capable of differentiating each road lane; a step S200 of estimating a vehicle location on a road using GPS information; a step S300 of checking whether the vehicle location information is normal using a difference between variation $\Delta\Psi_{k+1}^{GPS}$ in the azimuth angle of the vehicle obtained by using the GPS information and variation $\Delta\Psi_{k+1}^{veh}$ in the azimuth angle of the vehicle obtained by using the steering wheel model; and a step S500 of determining and outputting a drive lane occupied by the running vehicle, wherein, if the vehicle location information is normal as a result of the step S300, the step S500 is performed without a compensating step S400 so that the GPS information obtained in the step S200 is output as the road lane, and if the vehicle location information is abnormal, the compensating step S400 and the step S500 are performed in turn so that the road lane is output according to the result of the step S400.

Further, the present invention provides a method of determining a drive lane using a steering wheel model, including a step S100 of preparing a precise digital map having an accuracy capable of differentiating each road lane; a step S200 of estimating the vehicle location on a road using GPS information; and a step S300 of obtaining an azimuth angle $\Psi_{k+1}^{DR}$ of the vehicle using a previous azimuth angle $\Psi_k^{GPS}$ of the vehicle obtained by using the GPS information and variation $\Delta\Psi_{k+1}^{veh}$ azimuth angle of the vehicle obtained by using the steering wheel model, and checking whether the vehicle location information is normal using a difference between a current azimuth angle $\Psi_{k+1}^{GPS}$ of the vehicle obtained by using the GPS information and a current azimuth angle $\Psi_{k+1}^{DL}$ of the vehicle, wherein, if the vehicle location information is normal as a result of the step S300, a step S500 of determining and outputting a drive lane information occupied by a running vehicle is performed without a compensating step S400 so that the GPS information obtained in the step S200 is output as the road lane information, and if the vehicle location information is abnormal, the compensating step S400 and the step S500 are performed in turn so that the road lane information is output according to the result of the step S400.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
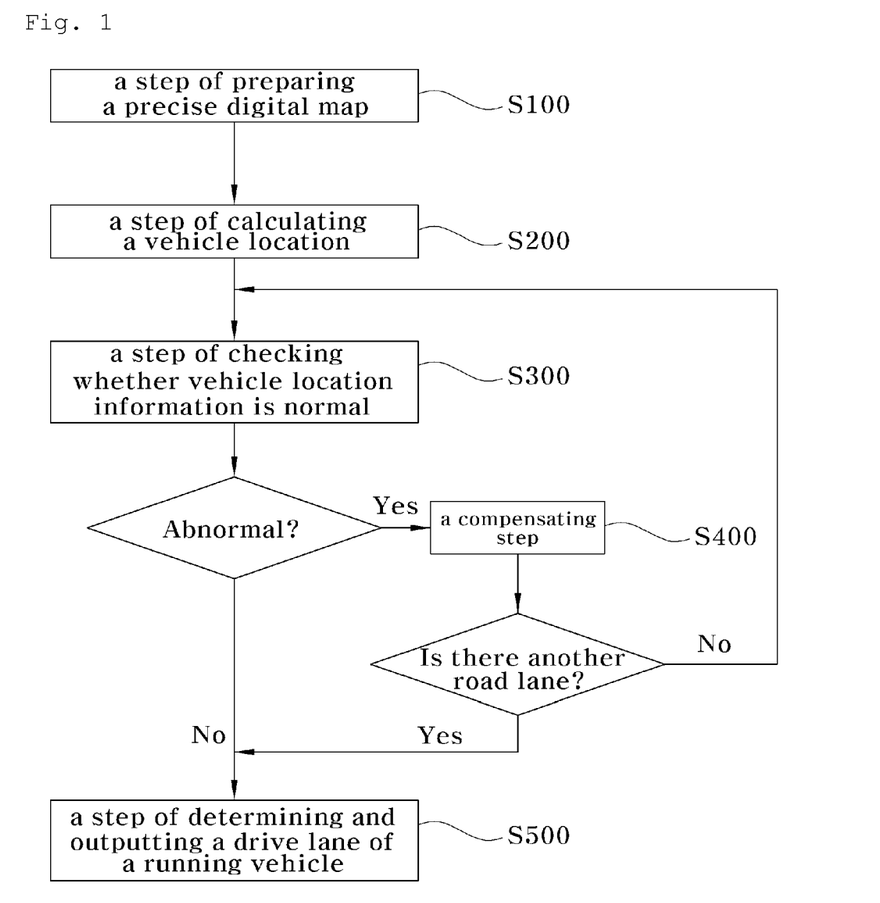
FIG. 1 is a flow chart of a drive lane determination method according to an embodiment of the present invention.

The present invention is to provide a method of exactly determining a drive lane of a running vehicle using a precise digital map capable of differentiating each road lane and carrier-based differential GPS information having a high accuracy capable of recognizing each road lane. To this end, as shown in FIG. 1, the present invention includes a step S100 of preparing a precise digital map, a step S200 of calculating a vehicle location, a step S300 of checking whether vehicle location information is normal, a compensating step S400 and a step S500 of determining and outputting a road lane of a running vehicle.

(1) The Step S100 of Preparing a Precise Digital Map

In this step, a digital map stored in a navigation system is prepared into a precise digital map having a high accuracy capable of differentiating each road lane.

The navigation system (hereinafter, called 'vehicle terminal') used in a vehicle stores a map including road network information, information of the number of road lanes and the like. The vehicle terminal guides a route to a destination using the information included in the map.

However, a conventional vehicle terminal did not inform an exact drive lane occupied by a running vehicle while guiding a route to a destination.

Therefore, the present invention uses a precise digital map including information (hereinafter, called 'lane differentiation information) of lane differentiation on a road as well as the road network information and the information of the number of road lanes, instead of the conventional digital map.

(2) The Step S200 of Calculating a Vehicle Location

In this step, the vehicle terminal precisely and exactly calculates a vehicle location on a road using GPS information received from a station and other GPS information directly received through the vehicle terminal.

In order to obtain the GPS information having a high accuracy capable of differentiating a drive lane occupied by a running vehicle, the present invention uses carrier-based differential GPS information which can provide precise location information, instead of the conventional GPS information.

The conventional GPS information provides service of measuring location, speed and time of a vehicle using a satellite. In the location measurement, a GPS receiver measures precise time and distance using four or more navigation satellite systems and then calculates a user location using a triangulation method.

However, since signals received from the navigation satellite systems includes various errors such as satellite orbit information error, satellite time information error, time delaying error occurred when GPS signals pass through the ionosphere and the troposphere, receiver error and the like, the measurement error comes to about 10 m. Therefore, the conventional GPS information is not suitable to differentiate a road lane having a width of about 3 m.

Differential GPS (DGPS) or differential global navigation satellite system (DGNSS) has been proposed to solve the problems in the conventional GPS information.

In the DGNSS which is a relative positioning type GPS measuring technique, a GPS station is disposed at a standard point of which a location is already known. The GPS station receives satellite signal, compensates errors and then provides the compensated signal to a vehicle or a user through a ground wireless communication network.

Figure 2:
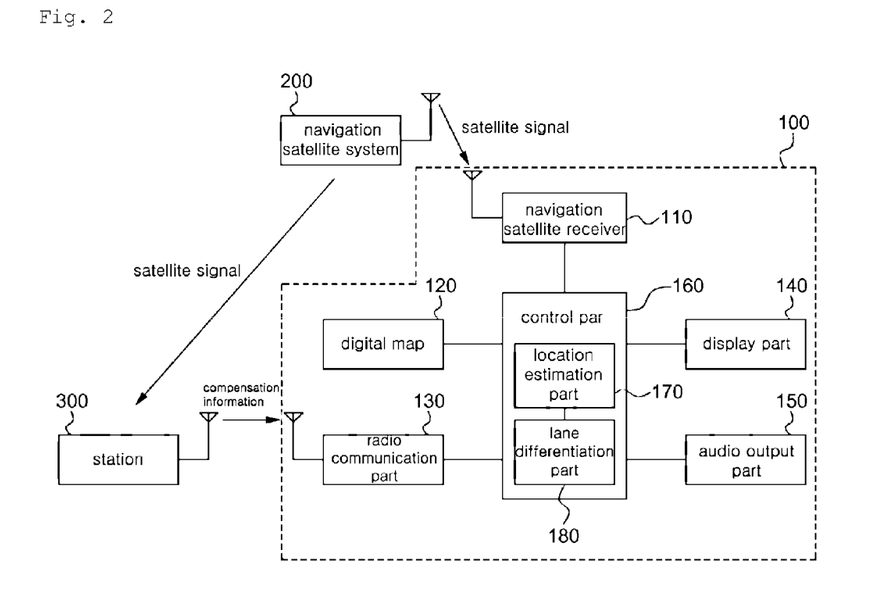
FIG. 2 is a block diagram showing an example of a navigation device according to the present invention.

Referring to FIG. 2, a vehicle terminal 100 in which the DGNSS is applied includes a navigation satellite receiver 110, a digital map 120, a radio communication part 130, a display part 140, an audio output part 150, a control part 160 and the like.

The navigation satellite receiver 110 is to receive satellite signal transferred from a navigation satellite system 200. In general, the navigation satellite receiver 110 may be called as a GPS module.

The digital map 120 is to store GIS (geographic information system) data with respect to roads and major landmarks around the roads. As described above, the present invention utilizes a precise digital map having lane differentiation information of various roads having multiple lanes.

The radio communication part 130 receives compensation information from a station 300 in order to calculate an accurate location. The station 300 transfers to the radio communication part 130 a compensation error value calculated by comparing an accurately measured position of the station 300 and signals received from the navigation satellite system 200.

The display part 140 and the audio output part 150 are to output the information in the form of visual or audio information. For example, the display part 140 outputs the geographic information stored in the digital map 120 in the form of a map and also indicates a route on the map. The audio output part 150 outputs audio information relevant to straight movement, left turn, right turn and the like.

The control part 160 functions to control the display part 140 and the audio output part 150 on the basis of the data transferred from the navigation satellite receiver 110, the radio communication part 130 and the like.

Further, the vehicle terminal 100 includes a location estimation part 170 which estimates a vehicle location on the basis of the signals from the navigation satellite system 200 and the compensation information received from the station 300, and a lane differentiation part 180 which differentiates a drive lane occupied by a vehicle on the basis of the vehicle location estimated by the location estimation part 170 and the data of the digital map.

The location estimation part 170 and the lane differentiation part 180 are in the form of an algorithm or a program. The location estimation part 170 and the lane differentiation part 180 may be integrally formed with the control part 160 or may be separately formed from the control part 160.

According to the present invention, by using carrier-based DGNSS, it is possible to reduce the location error by an extent of a few dozen cm to a few mm, and thus it is possible to accurately estimate the location information.

Hereinafter, a method of estimating the vehicle location will be described fully.

Firstly, the location estimation part 170 estimates the vehicle location based on the signals of the navigation satellite system 200 and the compensation information of the station 300. Then, the location estimation part 170 determines a drive direction of the vehicle using the vehicle location information and the road lane information of the digital map 120. Herein, the drive direction can be determined by differential of past location information.

Figure 3:
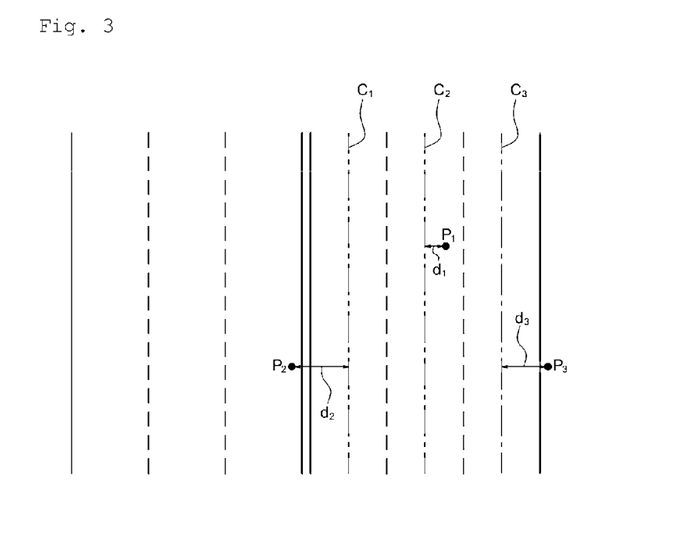
FIGS. 3 and 4 are conceptual views showing examples of obtaining location information of a vehicle according to the present invention.

If the drive direction is determined, even though it is recognized that the vehicle is located at an opposite road lane as indicated by P2 in FIG. 3, the present drive lane occupied by the vehicle can be determined on the basis of the determined drive direction of the vehicle.

Then, the lane differentiation part 180 calculates a distance between a vehicle location and a center line of each road lane using the road lane information of the digital map 120 and the estimated vehicle location. To this end, the digital map 120 has to include location information of the center line C1, C2, C3 of each road lane as shown in FIG. 3.

When the distance between the vehicle location and the center line of each road lane is calculated, a distance between the vehicle location and the center lines C1, C2 and C3 of first, second and third road lanes, as shown in FIG. 3, and then the lane having a minimum value among the calculated distances is determined as a drive lane.

For example, in case that the vehicle location estimated by the location estimation part 170 is P1, when calculating the distances between the location P1 and the center line C1, C2, C2 of each lane, a distance d1 between P1 and C2 is the minimum value. Therefore, the second line having the center line C2 is determined as the drive line.

Figure 4:
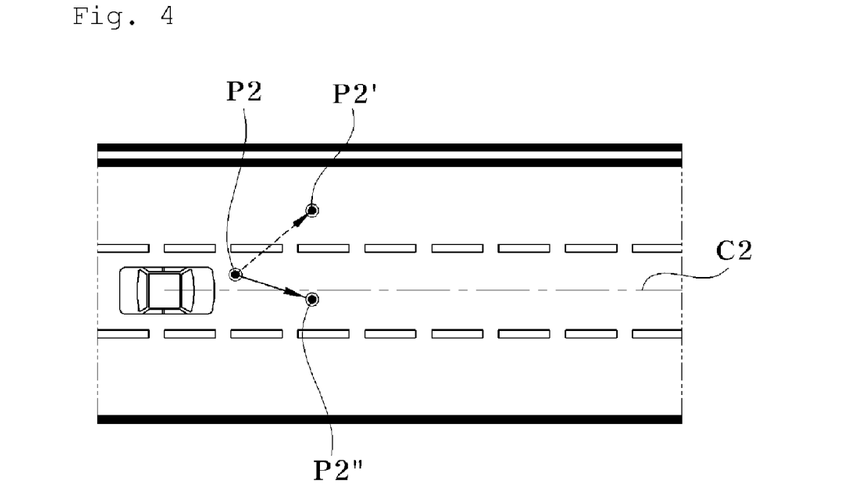
Figure 5:
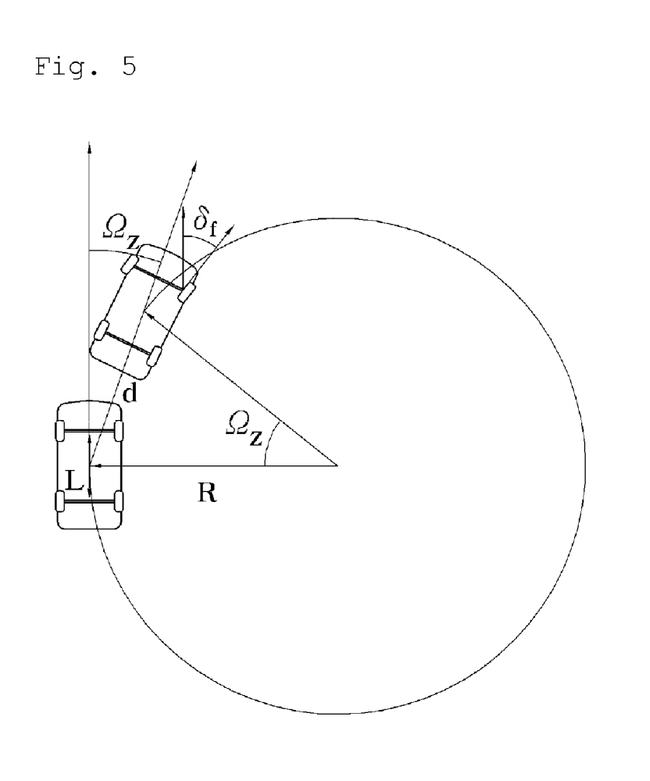
FIG. 5 is a view of a steering wheel model of a vehicle according to the present invention.

Herein, in case that the vehicle location estimated by the location estimation part 170 is P2, if the drive direction is determined as an upper direction of FIG. 4, the opposite lanes are excluded from the consideration. That is, since the drive direction is determined before calculation of the distance therebetween, it is possible to halve the extent of lane differentiation.

Therefore, the present invention can obtain the precise location information, thereby informing the actual drive lane occupied by the running vehicle.

(3) The Step S300 of Checking Whether Vehicle Location Information is Normal In the received GPS information (hereinafter, "GPS information") which is the location information calculated by the DGNSS, the location information P2' estimated by the GPS information may be different from the actual location information P2" due to unexpected error or signal receiving failure. In this case, it is not possible to exactly guide the running vehicle.

To solve the problem, the present invention calculates variation in an azimuth angle of the vehicle obtained by using the GPS information and variation in an azimuth angle (a rotated angle around a center axis of the vehicle) of the vehicle obtained by using a steering wheel model, and then compares them in order to check whether the GPS information is normal.

The variation $\Psi_{k+1}{}^{GPS}$ in the azimuth angle of the vehicle obtained by using the GPS information can be obtained by Equation 1.

$$\Psi_{k+1}{}^{GPS} = \Psi_{k+1}{}^{GPS} - \Psi_k{}^{GPS}, \quad \text{Equation 1}$$

wherein $\Psi_{k+1}{}^{GPS}$ is the variation in the azimuth angle of the vehicle obtained by using the GPS information, $\Psi_{k+1}{}^{GPS}$ is a current azimuth angle of the vehicle obtained by using the GPS information, and $\Psi_k{}^{GPS}$ is a previous azimuth angle of the vehicle obtained by using the GPS information.

And the variation $\Psi_{k+1}{}^{veh}$ in the azimuth angle of the vehicle obtained by using the steering wheel model is calculated by Equation 2.

$$\Delta\Psi_{k+1}{}^{veh} = \Omega_Z \times 1, \quad \text{Equation 2}$$

wherein $\Delta\Psi_{k+1}{}^{veh}$ is the variation in the azimuth angle of the vehicle obtained by using the steering wheel model, $\Omega_Z$ is a rotational angular velocity of the vehicle, and $t$ is time.

The rotational angular velocity $\Omega_Z$ can be calculated by using a vehicle speed V, distance L between front and rear axles, and a front wheel steering angle $\delta_j$ of the vehicle as shown in Equation 3. Herein, the front wheel steering angle $\delta_j$ can be obtained in real time through a torque sensor or an angular velocity sensor installed at the vehicle. The obtained information is input to the vehicle terminal through wire or wireless communication.

$$\Omega_z = \frac{V}{L}\delta_j, \quad \text{Equation 3}$$

wherein $\Omega_Z$ is the rotational angular velocity, V is the vehicle speed, L is the distance between the front and rear axles, and $\delta_j$ is the front wheel steering angle of the vehicle.

If the variation $\Delta\Psi_{k+1}{}^{GPS}$ in the azimuth angle of the vehicle obtained by using the GPS information and the variation $\Delta\Psi_{k+1}{}^{veh}$ the azimuth angle of the vehicle obtained by using the steering wheel model are calculated by Equations 1 and 2, these values are compared with each other as indicated by Equation 4. If the difference is less than a predetermined value, it is determined that the GPS information is normal, but if the difference is more than the predetermined value, it is determined that the GPS information is abnormal.

$$|\Delta\Psi_{k+1}{}^{GPS} - \Delta\Psi_{k+1}{}^{veh}| \geq T, \quad \text{Equation 4}$$

wherein $\Delta\Psi_{k+1}{}^{GPS}$ is the variation in the azimuth angle of the vehicle obtained by using the GPS, $\Delta\Psi_{k+1}{}^{veh}$ is the variation in the azimuth angle of the vehicle obtained by using the steering wheel model, and T is a threshold value which is set by a user.

As a result of the determination, if the GPS information is normal, the step S500 of determining and outputting the drive lane of the running vehicle, which will be described below, is carried out without performing the compensating step S400 which will be described below, and thus the GPS information obtained in the step S200 of calculating the vehicle location is output as the road lane information. If the GPS information is abnormal, the compensating step S400 and the step S500 of determining and outputting the road lane of the running vehicle are performed in turn, and thus the road lane information is output according to the result of the compensating step S400.

(4) The Compensating Step S400

In this step, if it is determined in the step S300 that the GPS information is abnormal, that is, if the difference between the variation $\Delta\Psi_{k+1}{}^{GPS}$ in the current azimuth angle of the vehicle obtained by using the GPS information and the variation $\Delta\Psi_{k+1}{}^{veh}$ in the azimuth angle of the vehicle obtained by using the steering wheel model is more than a predetermined value T, the azimuth angle $\Psi_{k+1}{}^{DR}$ of the vehicle is estimated by using the variation $\Delta\Psi_{k+1}{}^{veh}$ in the azimuth angle of the vehicle obtained by using the steering wheel model, and then the drive lane occupied by the running vehicle is determined using the relationship between the estimated azimuth angle $\Psi_{k+1}{}^{DR}$ of the vehicle and the road lane.

In other words, if it is determined that the GPS information is abnormal, the azimuth angle $\Psi_{k+1}{}^{DR}$ of the vehicle is obtained by using the previous azimuth angle $\Psi_k{}^{GPS}$ of the vehicle obtained by using the GPS information and the variation $\Delta\Psi_{k+1}{}^{veh}$ in the azimuth angle of the vehicle obtained by using the steering wheel model, as indicated by Equation 5.

$$\Psi_{k+1}{}^{DR} = \Psi_k{}^{GPS} + \Delta\Psi_{k+1}{}^{veh}, \quad \text{Equation 5}$$

wherein $\Psi_{k+1}{}^{DR}$ is the azimuth angle of the vehicle, $\Psi_k{}^{GPS}$ is the previous azimuth angle of the vehicle obtained by using the GPS information, and $\Delta\Psi_{k+1}{}^{veh}$ is the variation in the azimuth angle of the vehicle obtained by using the steering wheel model.

Figure 6:
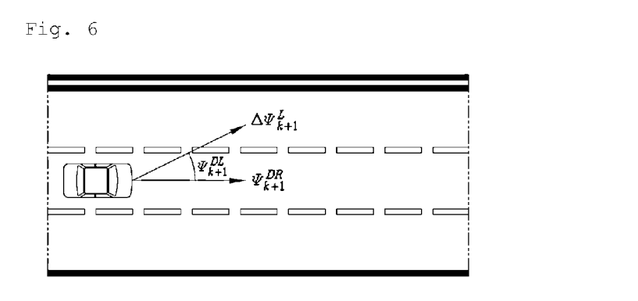
FIG. 6 is a view showing relationship among an azimuth angle of a vehicle with respect to a road lane, an azimuth angle of the vehicle calculated by using GPS information and road lane azimuth angle of the vehicle.

If the azimuth angle $\Psi_{k+1}{}^{DR}$ of the vehicle is calculated by Equation 5, an azimuth angle $\Psi_{k+1}{}^{DL}$ of the vehicle with respect to the road lane is calculated by Equation 6 which will be described below. The relationship among the azimuth angle $\Psi_{k+1}{}^{DL}$ of the vehicle with respect to the road lane, the azimuth angle $\Psi_{k+1}{}^{DR}$ of the vehicle and a road lane azimuth angle $\Psi_{k+1}{}^{L}$ of the vehicle is shown in FIG. 6.

$$\Psi_{k+1}{}^{DL} = \Psi_{k+1}{}^{DR} - \Psi_{k+1}{}^{L}, \quad \text{Equation 6}$$

wherein $\Psi_{k+1}{}^{DL}$ is the azimuth angle of the vehicle with respect to the road lane, $\Psi_{k+1}{}^{DR}$ is the azimuth angle of the vehicle and $\Psi_{k+1}{}^{L}$ is the road lane azimuth angle of the vehicle. The road lane azimuth angle $\Psi_{k+1}{}^{L}$ of the vehicle can be obtained by using the road lane information stored in the precise digital map.

If the azimuth angle $\Psi_{k+1}{}^{DL}$ of the vehicle with respect to the road lane is obtained by Equation 6, the road lane occupied by the running vehicle is determined through Equations 7 to 9 using the obtained azimuth angle $\Psi_{k+1}{}^{DL}$ of the vehicle with respect to the road lane. That is, if the azimuth angle $\Psi_{k+1}{}^{DL}$ of the vehicle with respect to the road lane, which is obtained by Equation 6, is less than a predetermined value as indicated in Equation 7, the road lane which is determined to be occupied by the running vehicle is changed into a left lane, and if it is within a desired extent as indicated by Equation 8, the road lane is maintained, and if it is more than a predetermined value, the road lane is changed into a right lane.

$$\Psi_{k+1}{}^{DL} < -T_1, \quad \text{Equation 7}$$

wherein $\Psi_{k+1}{}^{DL}$ is the azimuth angle of the vehicle with respect to the road lane, and $T_1$ is a threshold value which is set by a user.

$$-T_1 \leq \Psi_{k+1}{}^{DL} < T_1, \quad \text{Equation 8}$$

wherein $\Psi_{k+1}{}^{DL}$ is the azimuth angle of the vehicle with respect to the road lane, and $T_1$ is the threshold value.

$$T_1 \leq \Psi_{k+1}{}^{DL}, \quad \text{Equation 9}$$

wherein $\Psi_{k+1}{}^{DL}$ is the azimuth angle of the vehicle with respect to the road lane, and $T_1$ is the threshold value.

However, the above-mentioned description can be applied only when other road lanes are provided left and right. Although the vehicle is running on a rightmost lane, it may be determined that the conditions of Equation 9 are satisfied as the result of the compensating step. In this case, it is necessary to change the road lane into another right lane, but since the current road lane is the rightmost lane, it is impossible to change the road lane. This problem may be also occurred when the vehicle is running on a leftmost lane.

According to the present invention, in case that, as the result of the compensating step, it is necessary to change the road lane into another right or left lane although the vehicle is running on the rightmost or leftmost lane, that is, in case that there is not another right or left lane, the step S300 of checking whether vehicle location information is normal and the compensating step S400 are performed again, as shown in FIG. 1.

Figure 7:
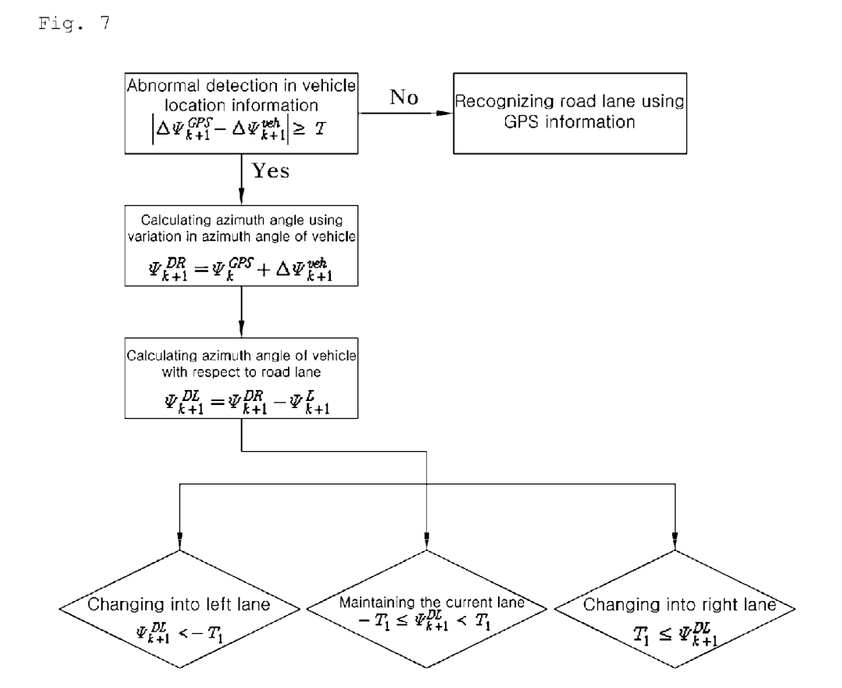
FIGS. 7 and 8 are flow charts showing a step of checking whether vehicle location information is normal and a compensating step according to each embodiment of the present invention.

Till now, it is described about the method of checking whether vehicle location information is normal and the compensating method. Herein, as shown in FIG. 7, if the difference between the variation $\Delta\Psi_{k+1}{}^{GPS}$ in the azimuth angle of the vehicle obtained by using the GPS information and the variation $\Delta\Psi_{k+1}{}^{veh}$ in the azimuth angle of the vehicle obtained by using the steering wheel model is more that the predetermined value T, the azimuth angle $\Psi_{k+1}{}^{DR}$ of the vehicle is estimated by Equation 5 using the variation $\Delta\Psi_{k+1}{}^{veh}$ in the azimuth angle of the vehicle obtained by using the steering wheel model, and then the road lane azimuth angle $\Psi_{k+1}{}^{L}$ of the vehicle is obtained by Equation 6 using the estimated azimuth angle $\Psi_{k+1}{}^{DR}$ of the vehicle. And the drive lane occupied by the running vehicle is determined and compensated by Equations 7 to 9 using the obtained road lane azimuth angle $\Psi_{k+1}{}^{L}$ of the vehicle.

Figure 8:
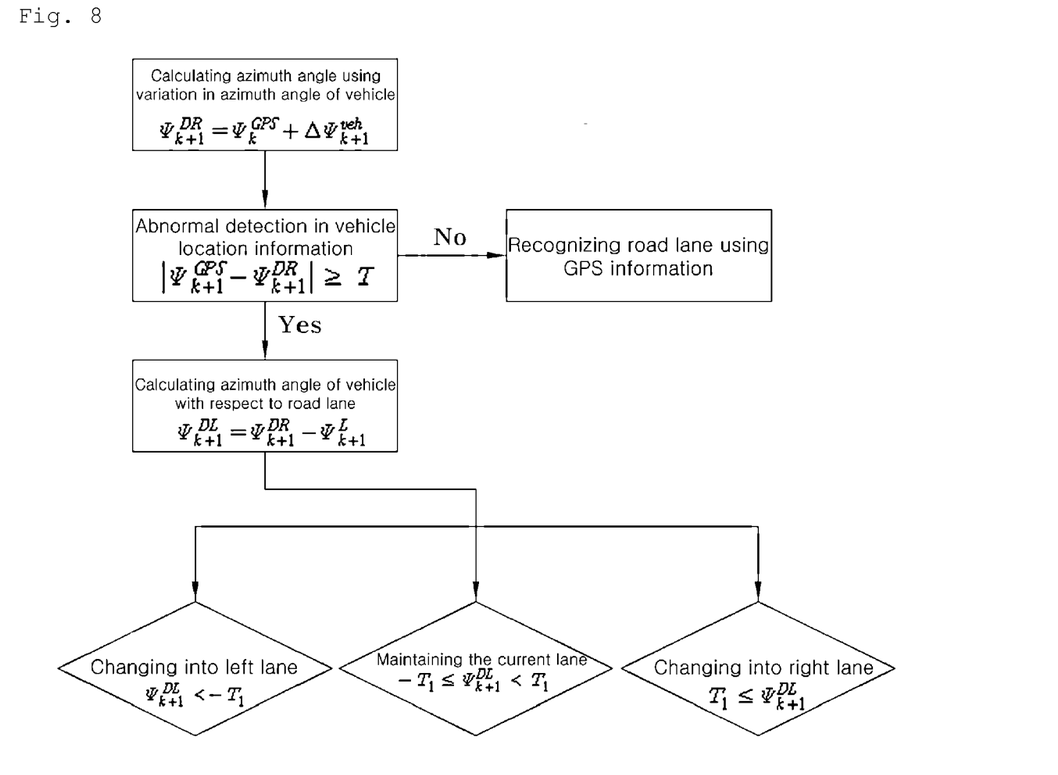
Figure 9:
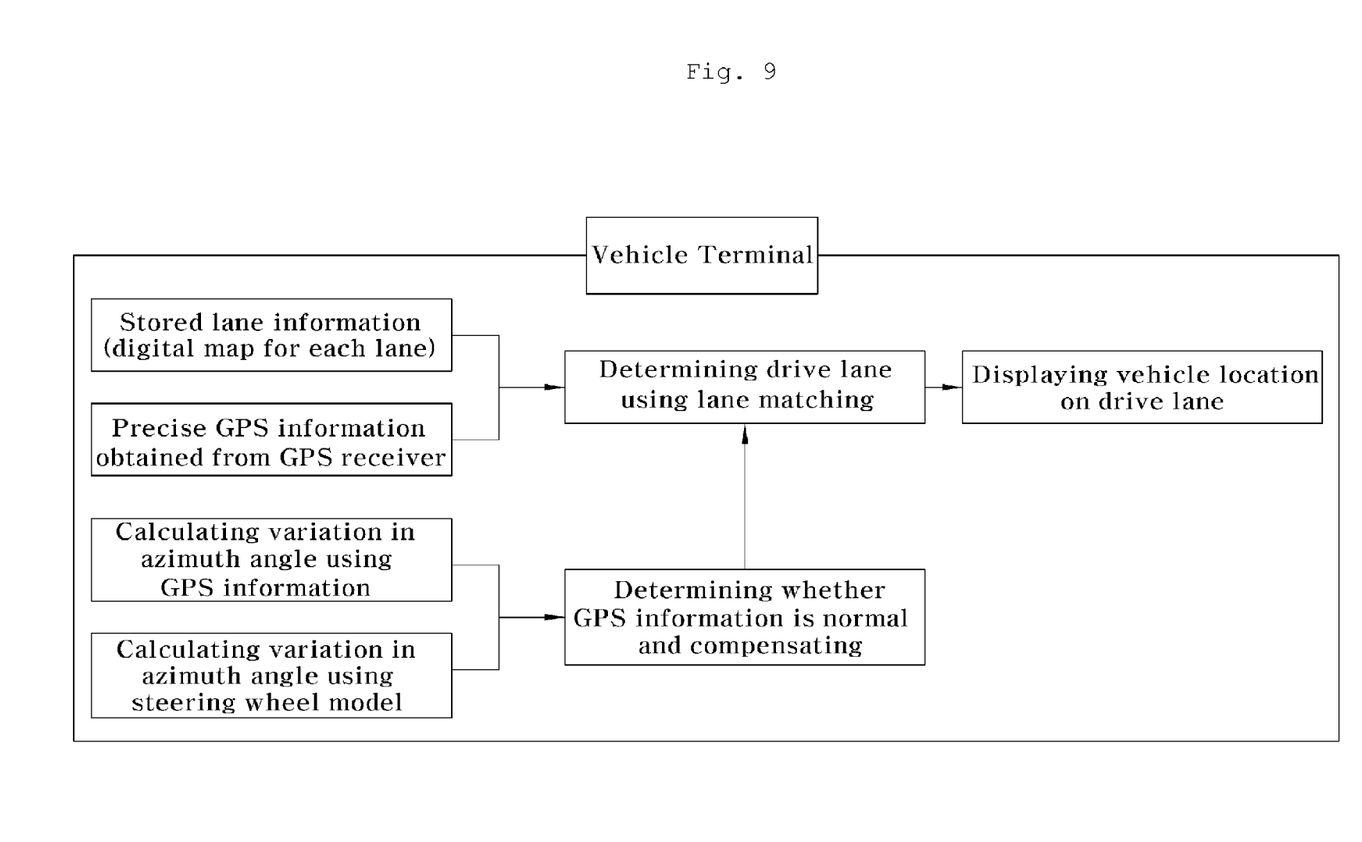
FIG. 9 is a block diagram of a navigation device according to an embodiment of the present invention.

Further, the present invention provides another method of checking whether vehicle location information is normal and another compensating method, as shown in FIG. 8. Herein, the azimuth angle $\Psi_{k+1}{}^{DR}$ of the vehicle is calculated by Equation 5 using the variation $\Delta\Psi_{k+1}{}^{veh}$ in the azimuth angle of the vehicle obtained by using the steering wheel model, and then it is determined by Equation 10 whether the GPS information is normal using the calculated vale. If the GPS information is normal, the step S500 of determining and outputting the drive lane of the running vehicle is performed without the compensating step S400, and if the GPS information is abnormal, the azimuth angle $\Psi_{k+1}{}^{DL}$ of the vehicle with respect to the road lane is obtained by using Equation 6, and the obtained value is applied to Equations 7 to 9. According to the result thereof, the compensating is performed so that the road lane is changed or maintained.

In other words, firstly, it is determined by Equation 4 whether the GPS information is normal. Unlike in the above embodiment in which the azimuth angle $\Psi_{k+1}{}^{DR}$ of the vehicle is obtained by Equation 5 only when the GPS information is abnormal, the azimuth angle $\Psi_{k+1}{}^{DR}$ of the vehicle is obtained by Equation 5, and it is determined whether the GPS information is normal using the obtained value. Herein, Equation 10 instead of Equation 4 is used as a standard of determining whether the GPS information is normal. Then, if the GPS information is normal, the road lane is determined on the basis of the GPS information, and if the GPS information is abnormal, the azimuth angle $\Psi_{k+1}{}^{DL}$ of the vehicle with respect to the road lane is obtained by Equation 6, and the obtained value is applied to Equations 7 to 9. According to the result thereof, the compensating is performed so that the road lane is changed or maintained, or the step S300 of checking whether vehicle location information is normal and the compensating step S400 are performed again according to whether another changeable road lane exists.

$$|\Psi_{k+1}{}^{GPS} - \Psi_{k+1}{}^{DR}| \geq T, \quad \text{Equation 10}$$

wherein $\Psi_{k+1}{}^{GPS}$ is the current azimuth angle of the vehicle obtained by using the GPS information, and $\Psi_{k+1}{}^{DR}$ is the current azimuth angle of the vehicle, and T is a threshold value which is set by a user.

(5) The Step S500 of Determining and Outputting the Drive Lane of the Running Vehicle In this step, the location information obtained by the GPS information is matched with the road lane information stored in the vehicle terminal, reflecting the results of the step S300 of checking whether vehicle location information is normal and the compensating step S500, and thus the drive lane occupied by the running vehicle is determined. Then, the result is displayed on the vehicle terminal so that the drive lane occupied by the vehicle is displayed.

According to the present invention, since the vehicle location on the road is detected by using the carrier-based differential GPS information and the road lane is determined by using the precise digital map instead of the conventional digital map, it is possible to determine the drive lane occupied by the running vehicle.

Further, the azimuth angles (rotated angle around a center axis of the vehicle) of the vehicle obtained by using the carrier-based differential GPS information and the GPS information are compared with each other, and it is determined by the result thereof whether the GPS information is normal and the compensating thereof is performed. Therefore, reliability in the lane differentiation is improved.

While the present invention has been described with respect to the specific embodiments, it will be apparent to those skilled in the art that various changes and modifications may be made without departing from the spirit and scope of the invention as defined in the following claims.

What is claimed is:

1. A method of determining a drive lane using a steering wheel model, comprising:
    a step (S100) of providing a digital map including first road lane information;
    a step (S200) of estimating a first road lane where a vehicle is currently located using GPS information;
    a step (S300) of (i) obtaining a current azimuth angle $\Psi_{k+1}^{DR}$ of the vehicle using a previous azimuth angle of the vehicle $\Psi_k^{GPS}$ that is obtained by using the GPS information and an azimuth angle variation $\Delta\Psi_{k+1}^{veh}$ of the vehicle obtained by using a steering wheel model, and (ii) checking whether the first road lane information is normal using a difference between a current azimuth angle $\Psi_{k+1}^{GPS}$ of the vehicle obtained by using the GPS information and the current azimuth angle $\Psi_{k+1}^{DR}$ of the vehicle;
    if the first road lane information is normal, a step (S500) of determining and outputting the first road lane information as a drive lane where the vehicle is currently located without a compensating step (S400); and
    if the first road lane information is abnormal, performing the compensating step (S400) to update the first road lane information into compensated second road lane information and performing the step (S500) to determine and output the second road lane information as the drive lane where the vehicle is currently located,
    wherein the azimuth angle variation of the vehicle ($\Delta\Psi_{k+1}^{veh}$), which is obtained by using the steering wheel model, is calculated by the following Equations 2 and 3:

$$\Psi_{k+1}^{veh} = \Omega_Z \times t, \quad \text{Equation 2}$$

wherein $\Delta\Psi_{k+1}^{veh}$ is the azimuth angle variation of the vehicle obtained by using the steering wheel model, $\Omega_Z$ a rotational angular velocity of the vehicle, and $t$ is time, and $$\Omega_Z = \frac{V}{L}\delta_j, \quad \text{Equation 3}$$

wherein $\Omega_Z$ is the rotational angular velocity, V is a speed of the vehicle, L is a distance between front and rear axles, and $\delta_j$ is a front wheel steering angle of the vehicle.

2. The method of claim 1, wherein an azimuth angle variation $\Delta\Psi_{k+1}^{GPS}$ of the vehicle obtained by using the GPS information is calculated by the following Equation 1:

$$\Delta\Psi_{k+1}^{GPS} = \Psi_{k+1}^{GPS} - \Psi_k^{GPS}, \quad \text{Equation 1}$$

wherein $\Delta\Psi_{k+1}^{GPS}$ is the azimuth angle variation of the vehicle obtained by using the GPS information, $\Psi_{k+1}^{GPS}$ is a the current azimuth angle of the vehicle obtained by using the GPS information, and $\Psi_k^{GPS}$ is the previous azimuth angle of the vehicle obtained by using the GPS information.

3. The method of claim 1, wherein, in the compensating step (S400), an azimuth angle $\Psi_{k+1}^{DL}$ of the vehicle with respect to a given road lane is calculated by the following Equation 6, and the compensating step is performed according to the following Equations 6-9;

$$\Psi_{k+1}^{DL} = \Psi_{k+1}^{DR} - \Psi_{k+1}^{L}, \quad \text{Equation 6}$$

wherein $\Psi_{k+1}^{L}$ is a road lane azimuth angle of the vehicle, $$\Psi_{k+1}^{DL} < -T_1, \quad \text{Equation 7}$$

wherein $T_1$ is a given threshold value, $$-T_1 \leq \Psi_{k+1}^{DL} < T_1, \quad \text{Equation 8}$$

and $$T_1 \leq \Psi_{k+1}^{DL}. \quad \text{Equation 9}$$

4. The method of claim 3, wherein, when it is necessary to move from the drive lane to the right or to the left based on a result of the compensating step (S400), but if there is no lane on the right or on the left, the step (S300) and the step (S400) are repeated.

5. A method of determining a drive lane using a steering wheel model, comprising:
    a step (S100) of providing a digital map including first road lane information;
    a step (S200) of estimating a first road lane where a vehicle is currently located using GPS information;
    a step (S300) of (i) obtaining an azimuth angle variation $\Delta\Psi_{k+1}^{GPS}$ of the vehicle obtained by using the GPS information and an azimuth angle variation $\Delta\Psi_{k+1}^{veh}$ of the vehicle obtained by using the steering wheel model, and (ii) checking whether the first road lane information is normal using a difference between the azimuth angle variation $\Delta\Psi_{k+1}^{GPS}$ of the vehicle obtained by using the GPS information and the azimuth angle variation $\Delta\Psi_{k+1}^{veh}$ of the vehicle obtained by using the steering wheel model;
    if the first road lane information is normal, a step (S500) of determining and outputting the first road lane information as a drive lane where the vehicle is currently located without a compensating step (S400); and
    if the first road lane information is abnormal, performing the compensating step (S400) to update the first road lane information into compensated second road lane information and performing the step (S500) to determine and output the second road lane information as the drive lane where the vehicle is currently located,
    wherein the step of checking whether the first road lane information is normal comprises:
    a step of determining the first road lane information is normal if the left side of Equation 4 is greater than or equal to a first given threshold value T, and
    a step of determining the first road lane information is abnormal if the left side of Equation 4 is less than the first given threshold value T, $$|\Delta\Psi_{k+1}^{GPS} - \Delta\Psi_{k+1}^{veh}| \geq T, \quad \text{Equation 4}$$

wherein $\Delta\Psi_{k+1}^{GPS}$ is calculated by the following Equation 1:

$$\Delta\Psi_{k+1}^{GPS} = \Psi_{k+1}^{GPS} - \Psi_k^{GPS}, \quad \text{Equation 1}$$

wherein $\Delta\Psi_{k+1}^{GPS}$ is the azimuth angle variation of the vehicle obtained by using the GPS information, $\Psi_{k+1}^{GPS}$ is the current azimuth angle of the vehicle obtained by using the GPS information, and $\Psi_k^{GPS}$ is the previous azimuth angle of the vehicle obtained by using the GPS information, wherein the second road lane information is a left lane of the first road lane information if the following Equations 5-7 are satisfied:

$$\Psi_{k+1}^{DR} = \Psi_k^{GPS} + \Delta\Psi_{k+1}^{veh}, \quad \text{Equation 5}$$

$$\Psi_{k+1}^{DL} = \Psi_{k+1}^{DR} - \Psi_{k+1}^{L}, \quad \text{Equation 6}$$

wherein $\Psi_{k+1}^{L}$ is a road lane azimuth angle of the vehicle, $$\Psi_{k+1}^{DL} < -T_1, \quad \text{Equation 7}$$

wherein $T_1$ is a given threshold value, and wherein the second road lane information is the same as the first road lane information if the following Equations 8 is satisfied:

$$-T_1 \leq \Psi_{k+1}^{DL} < T_1, \quad \text{Equation 8}$$

and wherein the second road lane information is a right lane of the first road lane information if the following Equations 9 is satisfied:

$$T_1 \leq \Psi_{k+1}^{DL}. \quad \text{Equation 9}$$

* * * * *